Nov. 3, 1936. O. G. BECK 2,059,927

WATER PASSOVER

Filed July 10, 1935 2 Sheets-Sheet 1

O. G. Beck
INVENTOR
BY Victor J. Evans & Co.
ATTORNEY

Nov. 3, 1936. O. G. BECK 2,059,927
WATER PASSOVER
Filed July 10, 1935 2 Sheets-Sheet 2
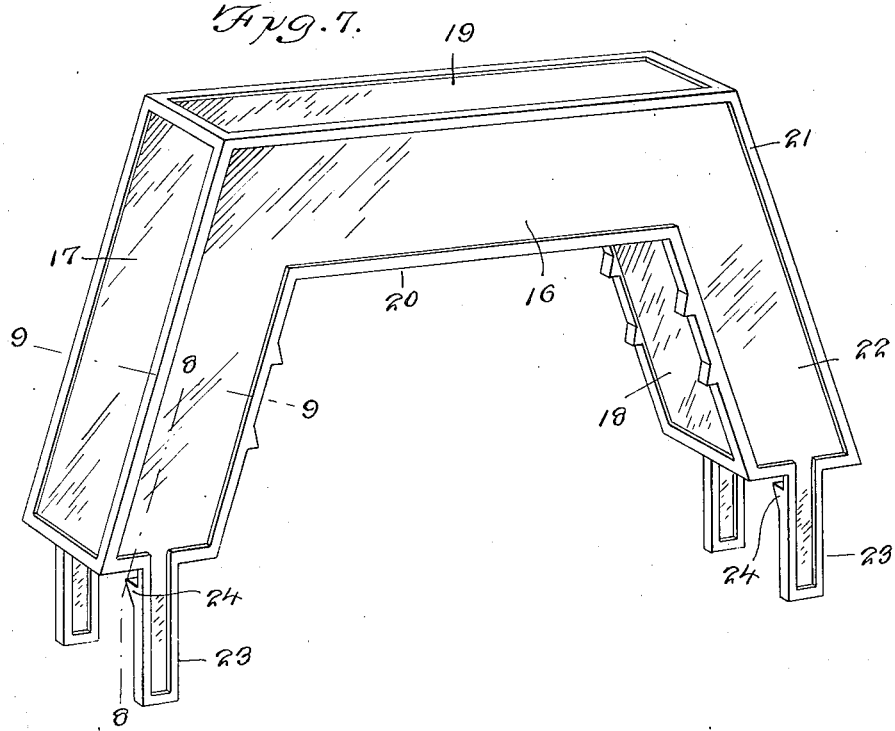
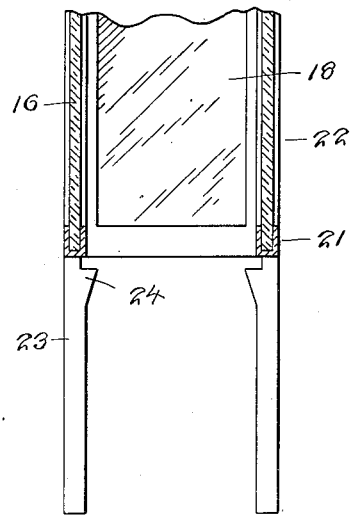
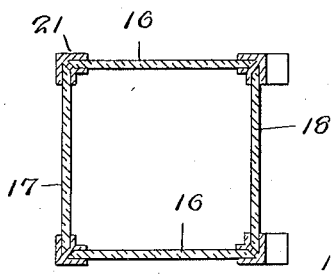
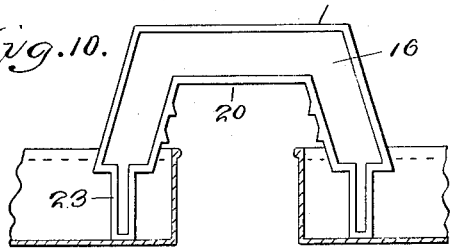
O. G. Beck INVENTOR
BY Victor J. Evans & Co.
ATTORNEY Patented Nov. 3, 1936

2,059,927

UNITED STATES PATENT OFFICE 2,059,927

WATER PASSOVER

Oscar G. Beck, Herrick, Ill.

Application July 10, 1935, Serial No. 30,726

2 Claims. (Cl. 61—21)

The invention relates to a swimway and more especially to a water passover for fish or the like.

The primary object of the invention is the provision of a device of this character, wherein when the necessity arises for the transfer of fish or the like from one aquarium, tank or other container to another there is effected a swimway so that the fish or the like can pass from one aquarium, container or the like to the other without the handling of the fish by hand and in this manner avoiding injury resultant from the hand touch.

Another object of the invention is the provision of a device of this character, wherein fish can swim back and forth from one aquarium, water container or the like to another with perfect freedom, the device being novel in construction and is readily and easily set for a water connection between adjacent aquariums, bowls, containers, pools or the like so that a water passover will be had therebetween.

A further object of the invention is the provision of a device of this character, wherein on the placing thereof in a certain position it can be utilized as a container for fish or the like and is adaptable for the interconnection of several aquariums, bowls, containers or pools so that the fish may swim from one to the other without injury and with perfect freedom.

A still further object of the invention is the provision of a device of this character, which is simple in construction, thoroughly reliable and efficient in operation, attractive in appearance, strong, durable and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 7 is a perspective view of a modified form of the device.

Figure 8 is a sectional view on the line 8—8 of Figure 7.

Figure 9 is a sectional view on the line 9—9 of Figure 7.

Figure 10 is a view similar to Figure 1 showing the modified form of the device in association with adjacent aquariums, tanks, pools or containers.

Similar reference characters indicate corresponding parts throughout the several views in the drawings.

Figure 1:
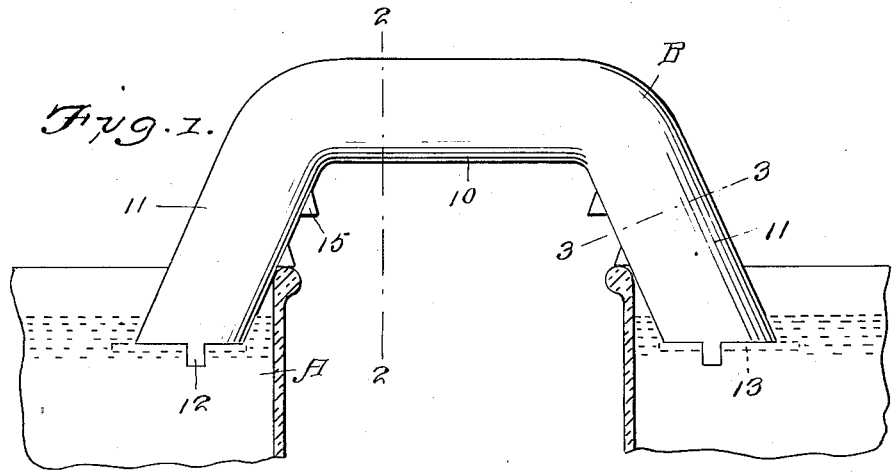
Figure 1 is a fragmentary vertical sectional view through a pair of glass aquariums, bowls, containers or the like showing the device in elevation constructed in accordance with the invention and associated therewith.
Figure 2:
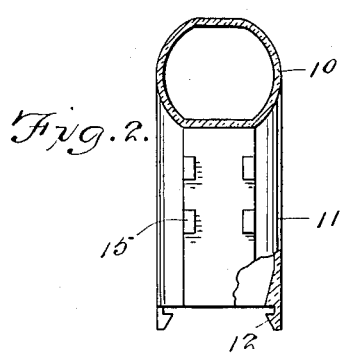
Figure 2 is a sectional view on the line 2—2 of Figure 1.
Figure 5:
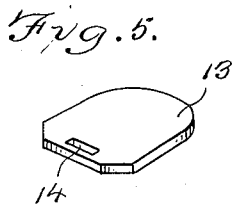
Figure 5 is a perspective view of a closure member for each open end of the device.
Figure 3:
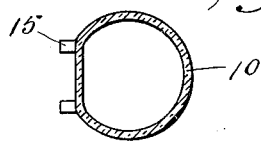
Figure 3 is a sectional view on the line 3—3 of Figure 1.
Figure 4:
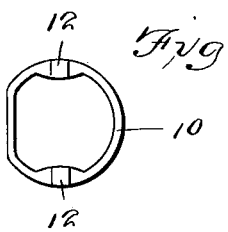
Figure 4 is an end elevation.

Referring to the drawings in detail, particularly Figures 1 to 6, inclusive, A designates generally portions of adjacent aquariums, bowls, containers or the like which may be of standard kind and are adapted to hold water and fish while B designates the device constituting the present invention and forming a water passover or swimway as hereinafter fully described in detail.

This device is in the form of a tubular body 10 preferably made from transparent material such as glass and has the angular leg portions 11, these being open at their ends and at such open ends are hook-like keeper lugs 12 for the releasable engagement therewith of gates 13. The gates 13 are slidably fitted in the lugs 12 and are provided with the slots 14 for a purpose presently described.

At the innermost sides of the legs 11 and integrally formed with the body 10 are spaced rest shoulders 15 so that the device can be mounted in position to serve as a water passover between the aquariums, tanks, containers or the like A whereby when the said device is filled with water and the gates 13 removed from the ends of the legs 11, these open ends of the legs being submerged in the water within the said aquariums, tanks, containers or the like A fish therein can pass through the device from one to the other of said aquariums, tanks, containers or the like as the device constitutes a water passover or a swimway.

Figure 6:
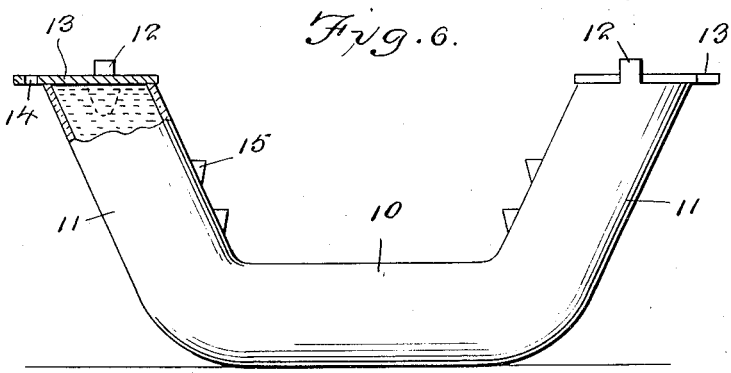
Figure 6 is a side elevation of the device in reversed position from that shown in Figure 1 and partly in section.

To have the device operate it is necessary to have the body 10 inverted from the position shown in Figure 1 of the drawings to the position shown in Figure 6 and in this position water is introduced into the body 10 to fill the same. Thereafter the gates 13 are placed in position to engage the lugs 12 so as to close the open ends of the body for retaining the filled condition of the device whereupon the filled device is turned on itself and placed as shown in Figure 1 with the shoulders 15 resting upon the edges of the open tops of the aquariums, tanks, containers or the like A, then by a suitable implement engaged in the slots 14 and the gates 13 these can be removed from the ends of the body 10 and thus the filled condition of the device constitutes a water passover or swimway between the aquariums, tanks, containers or the like.

In Figures 7 to 10 of the drawings there is shown a modification wherein the device is constituted by transparent side panels 16, outside and inside end panels 17 and 18, respectively, and outer and inner top panels 19 and 20, respectively. These panels are fitted with a frame 21, the panels being sealed at their edges next to the frame therewith. This frame has open ends at the leg portions 22 which are provided with the extensions 23 forming props. The extensions carry keepers 24 for the gates.

The modified form of device is usable in a similar manner to the preferred form of construction hereinbefore described in detail.

It is understood, of course, that changes, variations and modifications may be made in the device other than disclosed by the preferred and modified forms herein disclosed as fall properly within the scope of the appended claims without departing from the spirit of the invention or sacrificing any of its advantages.

What is claimed is:

1. A swim way providing a water passover for fish from one container to another comprising a reversible substantially U-shaped hollow body having fully opened ends and adaptable to be filled with a liquid when in normal position with the open ends upwardly, means releasably engageable with the open ends for effecting a liquid passover between the containers on inverting the hollow body and removing said means, the hollow body being transparent throughout the longitudinal extent thereof, and means exteriorly of the hollow body for enabling it to be brought to rest and be supported by the containers when in inverted position.

2. A swim way providing a water passover for fish from one container to another comprising a reversible substantially U-shaped hollow body having fully opened ends and adaptable to be filled with a liquid when in normal position with the open ends upwardly, means releasably engageable with the open ends for effecting a liquid passover between the containers on inverting the hollow body and removing said means, the hollow body being transparent throughout the longitudinal extent thereof, means exteriorly of the hollow body for enabling it to be brought to rest and be supported by the containers when in inverted position, and means on the hollow body for engaging the first-named means for releasably securing the same at the open ends of said body.

OSCAR G. BECK.